US009352510B2

(12) United States Patent
Roussel

(10) Patent No.: US 9,352,510 B2
(45) Date of Patent: May 31, 2016

(54) METHOD FOR ADJUSTING THE POSITION OF A TRANSPARENT ELEMENT

(75) Inventor: Eric Roussel, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 846 days.

(21) Appl. No.: 13/497,213

(22) PCT Filed: Sep. 22, 2010

(86) PCT No.: PCT/FR2010/051979
§ 371 (c)(1),
(2), (4) Date: Mar. 20, 2012

(87) PCT Pub. No.: WO2011/036402
PCT Pub. Date: Mar. 31, 2011

(65) Prior Publication Data
US 2012/0180932 A1     Jul. 19, 2012

(30) Foreign Application Priority Data

Sep. 28, 2009 (FR) ...................................... 09 56697

(51) Int. Cl.
    *B32B 41/00*     (2006.01)
    *B29C 65/00*     (2006.01)
    *B29C 63/16*     (2006.01)
    *B32B 38/18*     (2006.01)
    *B29L 11/00*     (2006.01)

(52) U.S. Cl.
CPC ............. *B29C 63/16* (2013.01); *B32B 38/1833* (2013.01); *B29L 2011/0016* (2013.01)

(58) Field of Classification Search
CPC . B29C 63/16; B29C 66/98; B29L 2011/0016; B32B 37/14; B32B 38/1833; B32B 41/00; G01B 11/14
USPC ............. 156/64, 378, 379, 367, 368; 356/615
See application file for complete search history.

(56) References Cited

U.S. PATENT DOCUMENTS

| 4,993,826 A | 2/1991 | Yoder, Jr. |
| 2007/0146687 A1 | 6/2007 | Divo et al. |

(Continued)

FOREIGN PATENT DOCUMENTS

| JP | 2005-69939 A | 3/2005 |
| JP | 2007-78581 A | 3/2007 |

(Continued)

OTHER PUBLICATIONS

Translation of JP 2007-078581, published 2007.*

*Primary Examiner* — George Koch
(74) *Attorney, Agent, or Firm* — Norton Rose Fulbright US LLP

(57) ABSTRACT

The invention relates to a method for adjusting the position of a transparent element (1), consisting in forming an image of a peripheral edge ($B_1$) of the transparent element, using the light diffused by said peripheral edge. In this way, movements by the transparent element relative to reference marks can be followed on a screen or carried out automatically based on an analysis of the image. The method can be used to apply a piece of film (2) to a spectacle lens, adjusting the distance between the respective peripheral edges ($B_1$, $B_2$) of the spectacle lens and the piece of film.

18 Claims, 2 Drawing Sheets

(56) References Cited

U.S. PATENT DOCUMENTS

Figure 1:
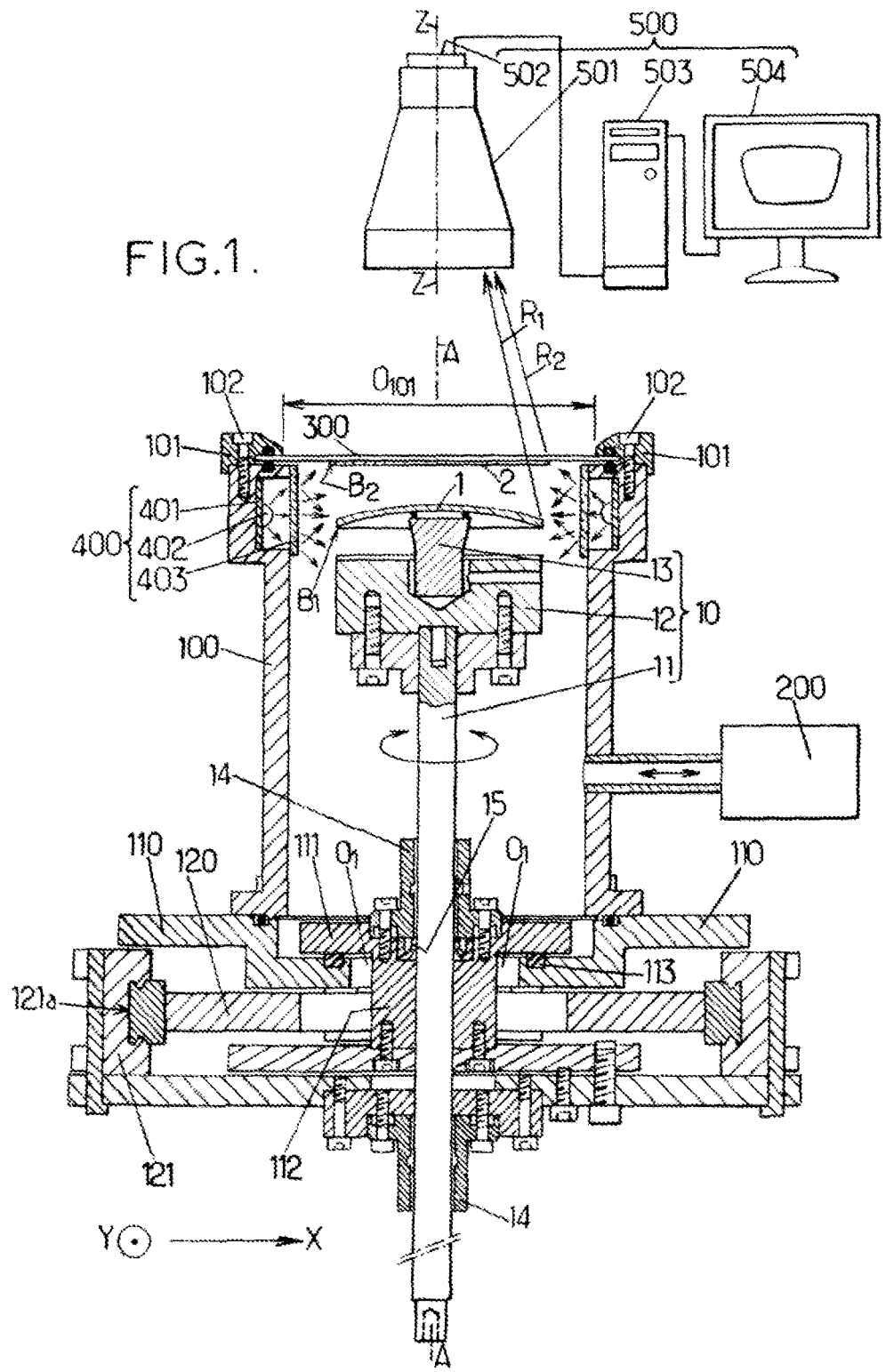

| | | |
|---|---|---|
| 2008/0314499 A1 | 12/2008 | Begon et al. |
| 2010/0193112 A1 | 8/2010 | Bovet et al. |
| 2010/0248590 A1* | 9/2010 | Shibata et al. .................... 451/5 |
| 2011/0174431 A1 | 7/2011 | Darmes et al. |
| 2012/0002162 A1 | 1/2012 | Allione et al. |

FOREIGN PATENT DOCUMENTS

| | | |
|---|---|---|
| WO | 2011/023877 A1 | 3/2011 |
| WO | 2011/023879 A2 | 3/2011 |

* cited by examiner

METHOD FOR ADJUSTING THE POSITION OF A TRANSPARENT ELEMENT

This application is a national stage entry of PCT/FR2010/051979, filed on Sep. 22, 2010.

The invention relates to a method for adjusting the position of a transparent element. It also relates to a device for pre-forming and applying a piece of film onto a transparent element, which is adapted for implementing such a method.

It is often necessary to position two elements, one of them transparent, relative to each other. In the present invention, transparency is understood to mean the ability of an element to allow light to pass through, so that objects on one side of the element are visible, without distortion, from the other side of the same element. When one of the two elements is transparent, it is difficult to define its position in order to adjust it relative to that of the other element, visually or using a camera. It is possible to place reference marks on the transparent element and visualize the position of this element using the reference marks. However, as such reference marks are visible and are placed on the element, they may be incompatible with the transparency required of the element concerned. It is also possible to determine the position of the transparent element using visual or photographic methods such as contact sensors or electrical sensors. But such methods based on contact sensors or electrical sensors are difficult to implement, particularly when there is limited space.

Under these conditions, a first object of the invention is to provide a method for aligning an element relative to reference marks indicating a reference position, which is suitable for when the element is transparent.

A second object of the invention is to provide such a method which can be implemented in a small amount of space around the transparent element.

A third object of the invention is to provide such a method which is simple and rapid to implement.

A fourth object of the invention is to provide such a method which can be carried out in an automated manner.

To achieve these and other objects, the invention proposes a method for adjusting a position of a transparent element which comprises two faces laterally joined by a peripheral edge, the element being transparent for a direction of propagation of light passing through its two faces. The method comprises the following steps:

/1/ arranging at least one light source, with light outputs which are distributed externally to and around the peripheral edge of the transparent element in a projection perpendicular to one of the faces of the transparent element, so that a portion of the light produced by the light source is diffused by at least a portion of the peripheral edge of the transparent element;

/2/ arranging an image formation system above one of the faces of the transparent element, so as to form an image of the portion of the peripheral edge of the transparent element by using the portion of the light which is diffused by this portion of the peripheral edge; and /3/ moving the transparent element to adjust a difference between the imaged portion of the peripheral edge of the transparent element and reference marks which indicate a reference position for the transparent element.

Thus, in one feature of the invention, a position of the transparent element is defined by forming an image from the light diffused by the peripheral edge of this element. This optical method of identifying the position of the element is therefore compatible with the transparency of this element to a light passing through its two faces.

Such a method of the invention is therefore optical. It does not require any contact between a contact sensor and the transparent element, or any electrical sensor. In addition, no marking of the element is required. The method is therefore simple and rapid to implement.

In addition, given that the method of the invention is based on forming an image, the optical system which is used to do this, meaning the image formation system, does not need to be immediately next to the transparent element. Various components can be placed between the transparent element and the image formation system, if these intermediate components are themselves transparent. The method of the invention can therefore be used when the transparent element is situated in a space which is crowded or limited in size, particularly inside an enclosure. In this case, it is sufficient to provide an opening in the enclosure for imaging the peripheral edge of the transparent element with the image formation system.

Lastly, the method of the invention may easily be automated, using image processing which reproduces the diffusing and illuminated portion of the peripheral edge of the optical element. Step /3/ may then be carried out by activating mechanisms which move the transparent element. Such mechanisms may comprise a motor-driven traveling table equipped with stepper motors, allowing movement along two axes of translation. They may additionally comprise a fastening head for the transparent element, adapted to rotate it on a longitudinal axis which intersects a plane parallel to the two axes of translation of the traveling table.

The reference marks indicating the reference position of the transparent element may be introduced in different ways into the captured image of the portion of the peripheral edge of this element. One way is for the reference marks for the reference position to be captured in the image at the same time as the imaged portion of the peripheral edge of the transparent element. In other words, the reference marks for the reference position of the transparent element are present in the vicinity of this element, and are imaged with the portion of the peripheral edge of the element in the same image capture. Alternatively, the reference marks indicating the reference position may be captured separately from the image of the portion of the peripheral edge of the transparent element. They may then be brought into this image, for example by superimposing them. In particular, another image of the reference marks indicating the reference position can be formed by the image formation system, separately from the image of the portion of the peripheral edge of the transparent element, with the system's image capture position remaining identical for the two images. The two images can then be subsequently superimposed, possibly with corrections to the optical effects of enlargement, parallax, angle of tilt of the image formation system, etc.

In a first improvement according to the invention, the image formation system may comprise a telecentric objective. The use of such an objective can reduce parallax effects which may interfere with the adjustment of the position of the transparent element relative to the reference marks for the reference position, based on the image(s) which is (are) captured.

In a second improvement, a light diffusing element may be placed between the light outputs and the peripheral edge of the transparent element. This can increase the interval of values for the angles of incidence of the light sent by the source to the peripheral edge of the transparent element. The light which is diffused by the edge of the transparent element is then more distributed along this edge, which reduces local light saturations in the image and increases the portion of the edge which is imaged.

A method of the invention can be used for numerous applications, particularly the following:

edging an ophthalmic spectacle lens or verifying such a spectacle lens which has already been edged. In this first application, the transparent element comprises the lens to be edged to fit the rim of an ophthalmic eyeglass frame, and the reference marks indicating the reference position correspond to a template which identifies the shape of the rim the lens is to fit into within the eyeglass frame;

recording a template which identifies the shape of the rim of an ophthalmic eyeglass frame. In this second application, the transparent element comprises the template and the reference marks which indicate the reference position determine a frame of reference for the template commonly called the boxing center; and applying a film onto an ophthalmic spectacle lens. For this third application, the transparent element comprises the lens, edged to fit into the rim that will house the lens in an ophthalmic eyeglass frame. The reference marks indicating the reference position are then formed by a peripheral edge of a piece of film which is intended to be applied onto a face of the lens, with the respective peripheral edges of the lens and of the piece of film being intended to coincide with each other but at a predetermined offset.

For this third application, the piece of film may itself be transparent, with at least a portion of its own peripheral edge diffusing another portion of the light produced by the light source when the piece of film is held close to the light outputs. An image of the portion of the peripheral edge of the piece of film can then be captured by the image formation system. This image is formed with the other portion of the light which is diffused by the portion of the peripheral edge of the piece of film. In this case, the lens and the piece of film may be placed at the same time between the light outputs, along the projection perpendicular to one of the faces of the lens, so that the diffusing portions of the respective peripheral edges of the lens and of the piece of film appear simultaneously in the same image which is formed by the image formation system.

For the third application of the invention, step /3/ may be executed in a manner that adjusts the relative arrangement of the respective peripheral edges of the lens and the piece of film, with respect to each other within a projection plane. The method may then additionally comprise the following step:

/4/ applying the piece of film to a face of the lens, so as to assemble them with their respective edges coinciding but with the predetermined offset.

It is possible for the piece of film to be preformed before step /3/, to conform to the shape of the lens face onto which this piece of film is applied in step /4/.

Lastly, the invention also proposes a device for preforming a piece of film which is supported by a deformable membrane, and applying this piece of film onto a transparent element. This device is adapted to carry out a method as described above, to adjust the position of the transparent element relative to the piece of film. Such a device may comprise:

a chamber with variable internal pressure, with a wall of the chamber containing an opening;

means for attaching the membrane across the wall opening, so that the membrane closes off and seals the chamber, and so that the piece of film is supported by the membrane on the side of the membrane that is facing towards the inside of the chamber;

means for varying the pressure inside the chamber, with the membrane having a deformation in the wall opening which varies according to the pressure;

a holder which is adapted to hold the transparent element in the chamber, and to move it in parallel to the wall opening as well as to rotate it around an axis which intersects this wall opening;

at least one light source, arranged to illuminate at least a portion of a peripheral edge of the transparent element when the element is held by the holder, through light outputs distributed externally to and around the peripheral edge of the transparent element in a projection perpendicular to a face of this element;

an image formation system, adapted to form an image of the portion of the peripheral edge of the transparent element with a portion of the light produced by the light source and diffused by said portion of the peripheral edge of the transparent element, when said element is held by the holder; and means for applying the transparent element against the piece of film, when said piece of film is supported by the membrane.

In an improvement of the device, the opening in the chamber wall and the holder may additionally be arranged so that the light source simultaneously illuminates, through the light outputs, the portion of the peripheral edge of the transparent element held by the holder, and at least a portion of a peripheral edge of the piece of film supported by the membrane.

Advantageously, the holder may additionally be adapted to move the transparent element inside the chamber parallel to the axis which intersects the opening in the chamber wall. In other words, it allows moving the transparent element closer to or further away from the wall opening.

Figure 3:
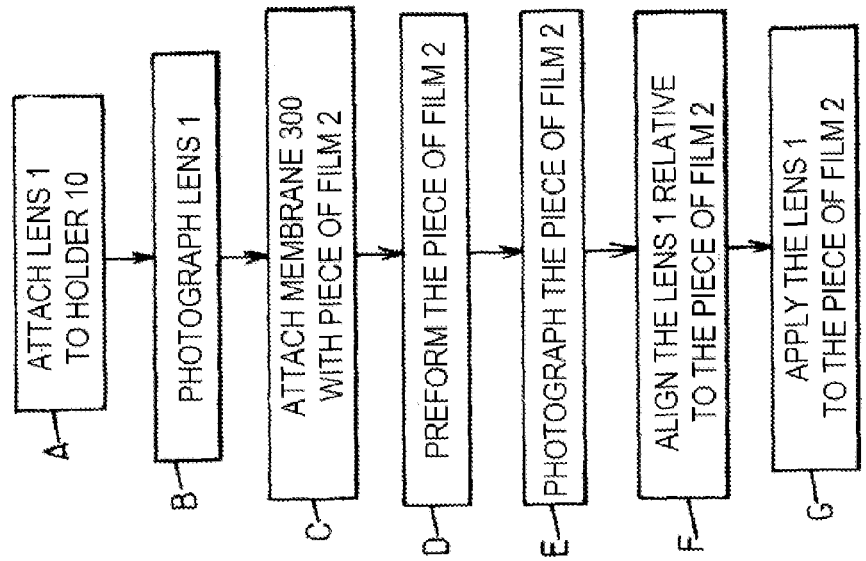
Figure 2A:
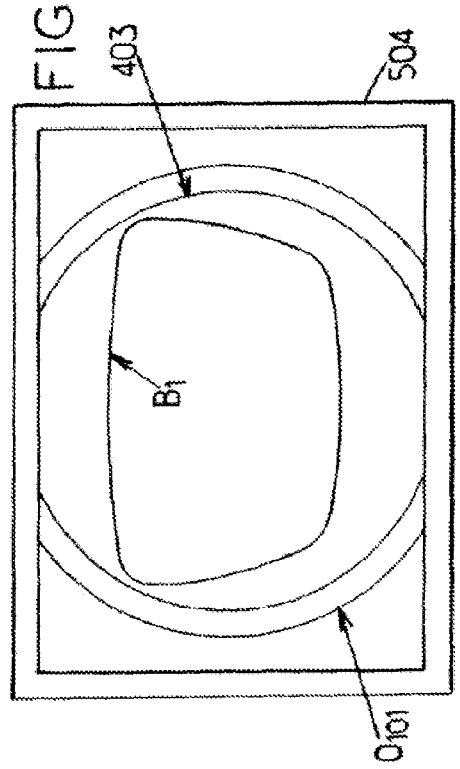
Figure 2B:
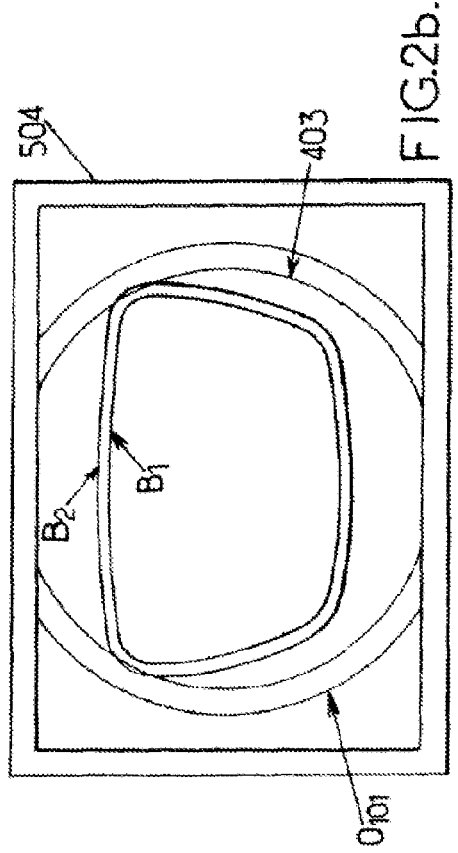

Other features and advantages of the invention will be apparent from the following description of a non-limiting example, with reference to the attached drawings in which:

FIG. 1 is a cross-sectional view of a device of the invention, for preforming and applying a piece of film onto a spectacle lens;

FIGS. 2a and 2b reproduce images formed using methods according to two variants of the invention; and FIG. 3 is a block diagram of the steps of a method for adhering a piece of film to a spectacle lens, using the invention.

For clarity, the dimensions of the elements represented in these figures do not correspond to the actual dimensions nor to the actual ratios between these dimensions. In addition, identical references in the different figures indicate the same elements or elements with the same functions.

The invention is described below in detail in a context of applying a piece of film onto an ophthalmic spectacle lens. This is purely for illustrative purposes. In this application, the transparent element consists of a lens which has been edged to fit into the rim of an eyeglass frame. This lens, which is denoted 1 in the figures, has two optical faces which are laterally joined by a peripheral edge $B_1$. The edge $B_1$ therefore corresponds to the shape of the rim of the spectacle frame.

The piece of film, denoted 2, has been previously cut so that it has a peripheral edge $B_2$ which also corresponds to the shape of the rim of the frame. In particular, the edge $B_2$ of the piece of film 2 may be arranged to coincide exactly with the edge $B_1$ of the lens 1 when it is applied onto the lens. Alternatively, the edge $B_2$ may be arranged to have a predetermined offset relative to the edge $B_1$, when the piece of film 2 is applied onto the lens 1. The offset may be positive, meaning advanced beyond the edge $B_1$, or negative, meaning recessed from the edge $B_1$.

In general, the face of the lens 1 onto which the piece of film 2 is to be applied, referred to as the application side, is curved while the piece of film 2 is initially flat. The application side of the lens 1 may be convex or concave. The piece of film 2 will then be reshaped for application onto the lens 1, into the shape of the application side of the lens. In this case, the edge $B_2$ of the piece of film 2 may be determined beforehand by taking into account the reshaping of the piece of film 2. In effect, the reshaping of the piece of film 2 may cause local variances in the offset of the edge $B_2$, which are compensated for in the predetermined shape of the edge $B_2$.

A particularly advantageous device is now described with reference to FIG. 1, which allows preforming the piece of film 2 and then applying it onto the lens 1. The following references are used to denote the elements referred to below:

- 10: a holder for the spectacle lens 1;
- 100: a side wall of a chamber with variable internal pressure;
- 101: an upper wall of the chamber, with an opening $O_{101}$;
- 102: a system for attaching a deformable membrane across the opening $O_{101}$;
- 110: a lower wall of the chamber;
- 111: a movable part which can be moved parallel to the lower wall 110 of the chamber;
- 200: a system for varying and controlling the pressure in the chamber;
- 300: the deformable membrane;
- 400: an internal lighting system for the chamber; and
- 500: an image formation system.

The upper wall 101 may have an annular shape around the opening $O_{101}$, with a flat circumference. It may be firmly attached, for example by means of multiple screws, to the upper edge of the side wall 100. When a peripheral edge of the deformable membrane 300 is inserted between the walls 100 and 101, the screws constitute the system 102 for attaching the membrane 300 around the opening $O_{101}$. The membrane 300 thus closes off the variable pressure chamber and forms a seal.

In another embodiment of the chamber, the upper wall 101 with the system 102 for attaching the membrane 300 around the opening $O_{101}$ may be detachable from the side wall 100. For example, the upper wall 101 may be moved closer and further away laterally, for example by sliding on rails. Thus the membrane 300 can be attached around the opening $O_{101}$ while the chamber remains open, and the chamber can be quickly closed by simply replacing the upper wall 101 on the side wall 100.

The system 200 for varying and controlling the pressure in the chamber is not represented in detail, as it is assumed that a person skilled in the art is familiar with such systems. The membrane 300, which is held by the attachment system 102, presents a deformation across the opening $O_{101}$ in a manner which varies with the pressure produced by the system 200. This deformation is inwards or outwards relative to the chamber depending on whether the system 200 produces a slightly negative or slightly positive pressure in the chamber relative to the outside.

The piece of film 2 is retained on the side of the membrane 300 facing the inside of the chamber. For example, an intermediate adhesive layer may be used between the piece of film 2 and the membrane 300. This adhesive layer is advantageously adapted so that the membrane 300 can be peeled off after the piece of film 2 has been permanently assembled with the spectacle lens 1. In addition, the adhesive layer is adapted so that the piece of film 2 is reshaped at the same time as the deformation of the membrane 300 when the pressure inside the chamber is varied. In this manner, the piece of film 2 can be preformed before it is applied onto the spectacle lens 1. During this preforming, the piece of film 2 remains parallel to and attached to the membrane 300. It is possible to heat the piece of film 2 and the membrane 300 before deformation, to reduce the stresses which may arise in the piece of film during the preforming and to avoid any defects which could result, such as stretching, cracks, or delamination.

The lower wall 110 has an orifice $O_1$, which may be centered relative to a longitudinal axis of the chamber denoted A-A. The movable part 111 closes the orifice $O_1$. In addition, it has a projecting portion 112 which extends through the orifice $O_1$ while being narrower than this orifice in all directions parallel to the lower wall 110. In this manner, the projecting portion 112 is compatible with the movements of the movable part 111 in these directions. The projecting portion 112 serves both to cause the movable part 111 to move and to support the holder 10. An annular seal 113 arranged between this lower wall 110 and the movable part 111, in a groove surrounding the orifice $O_1$ in the lower wall 110, seals the chamber at the orifice $O_1$ while allowing the displacements of the movable part 111 relative to the lower wall 110. In addition, a system for controlling the movements of the movable part 111 may comprise an assembly of rectilinear rails oriented in the direction of two axes X and Y, which are parallel to the lower wall 110 and preferably perpendicular to each other and transverse to the longitudinal axis A-A of the chamber. The movable part 111, when it is assembled with these rails, forms a small traveling table which moves along two axes, the fixed portion being connected to the lower wall 110. The reference 120 designates the portions of the movement control system which are movable only along the X axis, and the reference 121 designates the portions of this system which are movable along the Y axis relative to the portions 120. The reference 121a indicates the rails which enable displacements parallel to the Y axis. The rails for displacements parallel to the X axis are not visible in FIG. 1, as they are located in front of and in back of the plane shown in this figure. Similarly, the micrometer screws for controlling the lengths of the displacements along the X and Y axes are not represented. Such a movement control system is known, and it is unnecessary to describe it here in any further detail.

The movable part 111 is connected to the movable portion 121 by its projecting portion 112, such that it can be moved translationally in any directions which are combinations of two translational components respectively parallel to the X and Y axes. Thus, the plane of the X and Y axes is the plane of movement of the movable part 111. It is advantageously parallel to the plane of the opening $O_{101}$ which is closed off by the membrane 300.

The holder 10 for the spectacle lens 1 extends inside the chamber, in the direction of the opening $O_{101}$. It is supported by the projecting portion 112 of the movable part 111 and is adapted to hold the spectacle lens 1 firmly in place in the chamber. Such a holder 10 may comprise a shaft 11 which passes through the projecting portion 112, and which has a base 12 at its end inside the chamber. A fastening head 13, which is adapted to hold the spectacle lens 1 firmly, is itself attached to the base 12. The shaft 11 can slide parallel to the axis A-A through the projecting portion 112, and can rotate around an axis which is connected to the movable part 111 and parallel to the axis A-A (the circular arrow in FIG. 1). To do this, the projecting portion 112 may be fitted with guides 14 and a seal 15, which may be a gasket ring with an inner lip or a radial shaft seal. Thus the lens 1 can be moved in several ways relative to the deformable membrane 300, controlling the displacements from outside the chamber. It can be moved translationally in parallel to the plane of the axes X and Y, and brought into direct alignment with the piece of film 2. It can also be rotated to orient it to match the orientation of the piece of film 2 in the opening $O_{101}$. In addition, the spectacle lens 1 can be brought closer to the piece of film 1 by inserting the shaft 11 further into the chamber, through the lower wall 110.

The lighting system 400 is arranged on the face of the side wall 100 which is internal to the chamber, near the opening $O_{101}$. It may comprise a support 401 that is annular in shape and follows the upper edge of the side wall 100, light output sections 402, and optionally a diffusing element 403, also annular in shape. There are numerous alternative embodiments of the lighting system 400, in which the light output sections 402 are arranged angularly around the axis A-A in order to light the entire peripheral edge $B_1$ of the lens 1 in a continuous manner. Among the embodiments of the lighting system 400 which require little space, one can cite the use of a flexible printed circuit strip which forms the support 401, and which has electroluminescent diodes distributed along the strip. In this case, the diode emission surfaces form the output sections 402. Alternatively, optical fibers may be fixed to the support 401, with reflecting microprisms attached to their output sections to direct the light from a remote light source towards the axis A-A. In this second embodiment, the light source may be located outside the chamber and the optical fibers then pass through the side wall 100.

The diffusing element 403 may be a translucent ring having a face of a roughness appropriate for diffusing the light effectively. The roughness can be produced in a manner known to a person skilled in the art and appropriate for the constituent material of the element 403. For example, the diffusing element 403 may be of Teflon®.

The system 400 emits light in the direction of the edge $B_1$ of the lens 1. A portion of this light is then diffused by the edge $B_1$, in variable directions inside the chamber. In particular, secondary rays of light $R_1$ are thus produced which originate from the edge $B_1$ and pass through the opening $O_{101}$ in the upper wall 101 of the chamber. The diffusing element 403 allows illuminating the entire edge $B_1$ more uniformly, so that certain portions of it which are facing the light output sections 402 are not overly illuminated, and that other portions of the edge $B_1$ which are located between two output sections 402 are sufficiently illuminated. Thus the entire edge $B_1$ of the lens 1 returns light in diffuse form through the opening $O_{101}$. In addition, as the lens 1 is transparent between its two optical faces, it does not return light at any point besides its peripheral edge $B_1$.

Similarly, when the deformable membrane 300 is attached to the chamber with the piece of film 2, the peripheral edge $B_2$ of this film is illuminated by the light issuing from the output sections 402, through the diffusing element 403. The edge $B_2$ also diffuses a portion of this light through the opening $O_{101}$ when the membrane 300 is transparent. The reference $R_2$ denotes a secondary ray of this light which is diffused by the edge $B_2$ of the piece of film 2. Similarly to the lens 1, the center of the piece of film 2 does not produce diffuse light when the film used is transparent. The peripheral edge $B_2$ of the piece of film 2 thus forms a reference mark for the reference position of the lens 1. The edge $B_2$ may possibly be supplemented with alignment lines which are drawn around the piece of film 2, outside the edge $B_2$, and which also diffuse the light originating from the output sections 402. Such alignment lines may constitute an alignment pattern. They may be formed by cuts made in an edge portion of the film which was left on the membrane 300, outside the edge $B_2$, and which is separated from the piece of film 2 by cutting along the edge $B_2$.

The image formation system 500 comprises an objective 501 which is associated with an image sensor 502, an image processing unit 503, and a display screen 504. It is arranged so that the objective 501 forms an image on the sensor 502, and this image is processed by the unit 503 and displayed on the screen 504. The objective 501 is arranged outside the chamber, facing the opening $O_{101}$. The image sensor 402 may capture 1024×768 pixels, for example.

When the membrane 300 with the piece of film 2 is not attached onto the chamber, the image formation system 500 allows viewing the lens 1 on the screen 504 (FIG. 2*a*). Only the edge $B_1$ of the lens 1 appears in the image, and this edge is imaged by using the rays $R_1$ which are diffused by it.

When the membrane 300 with the piece of film 2 is attached onto the chamber by the system 102, and when the membrane 300 and the piece of film 2 are both transparent, the image formation system 500 allows viewing the lens 1 and the piece of film 2 at the same time on the screen 504 (FIG. 2*b*). If the piece of film 2 is not transparent, but the membrane 300 is, only the edge $B_2$ of the piece of film 2 is displayed.

The image formation system 500 is adapted to provide images of the spectacle lens 1 and the piece of film 2, separately or together, without modifying the position or the focus adjustment of the objective 501. To do this, the objective 501 is designed so that the images formed have a depth of field which is greater than the distance separating the edges $B_1$ and $B_2$ along an optical axis Z-Z of the objective.

The lens 1 and the piece of film 2 are initially apart from each other, by a distance which can be about 1 cm (centimeter), for example, along the axis A-A. Because of this distance, parallax defects may interfere with how the alignment of the edges $B_1$ and $B_2$ is perceived by the image formation system 500. A first defect could result from a transverse shift which would initially be large, between the lens 1 and the piece of film 2, parallel to the plane of the axes X and Y. This first defect is eliminated by initially positioning the lens 1 approximately in direct alignment with the piece of film 2. Two other parallax defects may result from a transverse offset of the objective 501 relative to the lens 1, and an angle of deviation between the optical axis Z-Z and the longitudinal axis A-A. To eliminate these defects, the objective 501 can be maintained above the opening $O_{101}$ so that its optical axis Z-Z passes substantially through the boxing center of the spectacle lens 1 and is perpendicular to the midplane of the lens. Advantageously, the objective 501 may be telecentric in order to reduce these parallax defects.

In a first operation mode which may be manual, the lens 1 and the piece of film 2 are displayed simultaneously on the screen 504, in the same image when the membrane 300 and the piece of film 2 are both transparent (FIG. 2*b*). The operator can rotate the holder 10 until the edge $B_1$ of the lens 1 appears parallel to the edge $B_2$ of the piece of film in the image. It also activates the movement control system for the movable part 111, to move the lens 1 laterally relative to the piece of film 2, along the two axes X and Y. It continues to move the lens 1 until the edges $B_1$ and $B_2$ appear one inside the other, with an interval of separation between them which appears constant along their entire length. The image formation system 500 updates in real time the image displayed on the screen 504, so that the operator can visually monitor the rotations and translations he is applying to the lens 1. At the end of the process, the lens 1 has been brought under the piece of film 2 and is exactly centered relative to it, and is oriented exactly as it is.

A second operation mode may alternatively be used when the membrane 300 is transparent, and is easily automated. The membrane 300 is not initially placed on the chamber, so the lens 1 appears directly through the opening $O_{101}$. A first image is then captured with the system 500, which shows the lens 1 at its initial position in the chamber (FIG. 2*a*). Image analysis software which is executed in the unit 503 can detect the luminance of the edge $B_1$ in the image, and can request that the height of the holder 10 with the lens 1 be adjusted relative to the lighting system 400, to increase this luminance of the edge $B_1$. The membrane 300, with the piece of film 2 it is supporting, is attached to the chamber using the system 102 or by restoring the upper wall 101 already fitted with the membrane 300, then a second image is captured without moving or modifying the adjustments of the objective 501. The second image shows the piece of film 2. The use of software for superimposing and processing the images allows automatically identifying the edges $B_1$ and $B_2$, and determining the differences between their respective orientations and positions. The unit 503 may then be used to activate the system for controlling the movements of the movable part 111, and for rotating the holder 10 based on these differences. It is possible to capture a supplemental image to verify that the edges $B_1$ and $B_2$ appear parallel and centered relative to each other.

A method for affixing the piece of film 2 onto the spectacle lens 1 will now be described with reference to FIG. 3.

In a first step (step A), the spectacle lens 1 is attached to the fastening head 13, preferably so that its boxing center is positioned on the longitudinal axis A-A of the chamber. A first photograph can then be captured with the image formation system 500, which shows the lens 1 by its diffusing edge $B_1$ (step B). It is possible to modify the height of the lens 1 in the chamber to increase the amount of light diffused by the edge $B_1$ so that it appears more clearly. In this case, the lens 1 is photographed again.

The membrane 300 is then attached to the chamber (step C), with the piece of film 2 which is supported by the membrane and facing towards the inside the chamber. Advantageously, the alignment pattern which may have been be drawn on an edge strip surrounding the piece of film 2, on the membrane 300, can help with centering the piece of film 2 relative to the axis A-A. In addition, the piece of film 2 may have an adhesive layer which is exposed and oriented to face the lens 1. Alternatively, an amount of glue can be placed on the application side of the lens 1.

The pressure in the chamber is varied in order to preform the piece of film (step D), possibly by simultaneously heating the piece of film in order to thermoform it. The edge $B_2$ of the piece of film 2 then assumes it final shape. When the edge $B_2$ has been initially designed to compensate for any local variances in the edge offset that occurs during the preforming, the final shape of the edge $B_2$ exactly corresponds to that of the edge $B_1$ of the lens 1.

The lens 1 is then moved and rotated according to the invention, relative to the piece of film 2, for example using the second type of operation described above (steps E and F). It is possible for the unit 503 to correct certain parallax defects digitally, using height data that has been sent for the lens 1 and for the piece of film 2.

Once the lens 1 is exactly aligned with the piece of film 2, it is applied against the film by inserting the shaft 11 further into the chamber, and pushing the film with the lens outward from the chamber (step G). The piece of film 2 is then permanently affixed to the application side of the lens 1, by the intermediate adhesive layer or the glue.

The pressure within the chamber can then be brought to the level of the outside pressure, the membrane 300 is freed by releasing the attachment system 102, and then the lens 1 is released from the fastening head 13. The membrane 300 is then detached from the piece of film 2 while the latter remains affixed to the lens 1. For example, the membrane 300 may be removed by peeling it off.

It is understood that implementations of the invention can be adapted from the above detailed description. In particular, the peripheral edge of the piece of film may be designed to be offset relative to the peripheral edge of the spectacle lens, when the film and the lens are applied to one another. The invention allows aligning the lens with the piece of film in a manner that obtains the desired offset.

Lastly, although the method of the invention has been described in a context of affixing a piece of film onto a spectacle lens, it can be used for other applications in the field of ophthalmology or in other fields. In the field of ophthalmology, it may also be used to verify whether the edging of a spectacle lens matches the shape of the rim that will house it in an eyeglass frame, or to record the shape of a template for the rim of such an eyeglass frame.

The invention claimed is:

1. A method for adjusting a position of a transparent element having two opposed faces laterally joined by a peripheral edge, the element being transparent for a direction of propagation of light passing through the two opposed faces, the method comprising:

arranging at least one light source with light outputs distributed externally to and around the peripheral edge of the transparent element, so that the entire peripheral edge of the transparent element is lit in a continuous manner by a portion of the light produced by the light source, and the portion of the light being diffused by the entire peripheral edge of the transparent element;

arranging an image formation system above one of the opposed faces of the transparent element, so as to form an image of the entire peripheral edge of the transparent element by using the portion of the light diffused by the entire peripheral edge of the transparent element, the peripheral edge of the transparent element being thus imaged entirely within each image formed, separately from other images; and moving the transparent element to adjust a difference between the imaged peripheral edge of the transparent element and reference marks which indicate a reference position for the transparent element.

2. The method according to claim 1, wherein the reference marks indicating the reference position are captured in the image at the same time as the imaged peripheral edge of the transparent element.

3. The method according to claim 1, wherein the reference marks indicating the reference position are captured separately from the image of the peripheral edge of the transparent element, then are brought into the image.

4. The method according to claim 3, wherein another image of the reference marks indicating the reference position is formed by the image formation system separately from the image of the peripheral edge of the transparent element, with an image capture position of the image formation system that is identical for the image of the peripheral edge of the transparent element and the other image of the reference marks indicating the reference position.

5. The method according to claim 1, wherein the image formation system comprises a telecentric objective.

6. The method according to claim 1, wherein a light diffusing element is placed between the light outputs and the peripheral edge of the transparent element.

7. The method according to claim 1, wherein the transparent element comprises an ophthalmic spectacle lens to be edged to fit a rim of an ophthalmic eyeglass frame, and the reference marks indicating the reference position correspond to a template which identifies a shape of the rim of the eyeglass frame.

8. The method according to claim 1, wherein the transparent element comprises a template identifying a shape of a rim of an ophthalmic eyeglass frame, and the reference marks indicating the reference position determine a frame of the template.

9. The method according to claim 1, wherein the transparent element comprises an ophthalmic spectacle lens edged to fit into a rim that will house the lens in an ophthalmic eyeglass frame, and the reference marks indicating the reference position are formed by a peripheral edge of a piece of film to be applied onto a face of the spectacle lens, with the respective peripheral edges of the spectacle lens and of the piece of film configured to coincide with each other but with a predetermined offset when the piece of film is applied onto the lens.

10. The method according to claim 9, wherein:
the piece of film is itself transparent, with the entire peripheral edge of the piece of film diffusing another portion of the light produced by the light source when the piece of film is held close to the light outputs of the light source, and
an image of the entire peripheral edge of the piece of film is captured by the image formation system, by forming the image with the other portion of the light diffused by the entire peripheral edge of the piece of film.

11. The method according to claim 10, wherein:
the reference marks indicating the reference position are captured in the image at the same time as the imaged peripheral edge of the transparent element; and
the spectacle lens and the piece of film are placed at the same time between the light outputs of the light source, along the projection perpendicular to one of the opposed faces of the spectacle lens, and wherein the respective peripheral edges of the spectacle lens and of the piece of film appear simultaneously in the same image formed by the image formation system.

12. The method according to claim 9, wherein moving the transparent element is executed so as to adjust a relative arrangement of the respective peripheral edges of the spectacle lens and the piece of film, with respect to each other within a projection plane, and wherein the method additionally comprises:
applying the piece of film to a face of the spectacle lens, so as to assemble the piece of film with the spectacle lens, with the respective edges of the piece of film and the spectacle lens coinciding but with the predetermined offset.

13. The method according to claim 12, wherein, before moving the transparent element, the piece of film is preformed according to the shape of the lens face onto which the piece of film is applied.

14. The method according to claim 1, wherein the portion of the light deviates at least 45 degrees after being diffused by the peripheral edge of the transparent element.

15. The method according to claim 1, wherein the entire peripheral edge of the transparent element is lit simultaneously.

16. A device comprising:
a variable pressure chamber having a wall with an opening;
a holder configured to hold a transparent element in the chamber, move the transparent element in parallel to the wall opening as well as to rotate the transparent element around an axis intersecting the wall opening, the transparent element having two opposed faces laterally joined by a peripheral edge, and one of the faces facing the opening when the transparent element is held by the holder;
at least one light source arranged to illuminate the entire peripheral edge of the transparent element held by the holder through light outputs distributed externally to and around the peripheral edge of the transparent element, the light outputs being angularly distributed around the axis so as to illuminate the entire peripheral edge of the transparent element in a continuous manner; and
an image formation system located above the opening and configured to form an image of the entire peripheral edge of the transparent element with a portion of the light produced by the light source and diffused by the entire peripheral edge of the transparent element, when the transparent element is held by the holder, so that the peripheral edge of the transparent element is thus imaged entirely within each image formed, separately from other images.

17. The device according to claim 16, wherein the opening in the chamber wall and the holder are additionally arranged so that the light source simultaneously illuminates, through the light outputs, the entire peripheral edge of the transparent element held by the holder, and the entire peripheral edge of a piece of film supported by the membrane.

18. The device according to claim 16, further comprising:
means for attaching the membrane across the wall opening so that the membrane closes off and seals the chamber, and so that a piece of film supported by the membrane is on a side of the membrane that is facing towards the inside of the chamber;
means for varying the pressure inside the chamber, the membrane having a deformation in the wall opening which varies according to the pressure; and
means for applying the transparent element against the piece of film supported by the membrane.

* * * * *

UNITED STATES PATENT AND TRADEMARK OFFICE
CERTIFICATE OF CORRECTION

PATENT NO. : 9,352,510 B2  
APPLICATION NO. : 13/497213  
DATED : May 31, 2016  
INVENTOR(S) : Eric Roussel Page 1 of 1

It is certified that error appears in the above-identified patent and that said Letters Patent is hereby corrected as shown below:

On the title page Item (73), line 1:

Delete "Essilor International" and replace with -- ESSILOR INTERNATIONAL (COMPAGNIE GENERALE D'OPTIQUE) --.

Signed and Sealed this  
Ninth Day of August, 2016

Michelle K. Lee  
*Director of the United States Patent and Trademark Office*